UNITED STATES PATENT OFFICE.

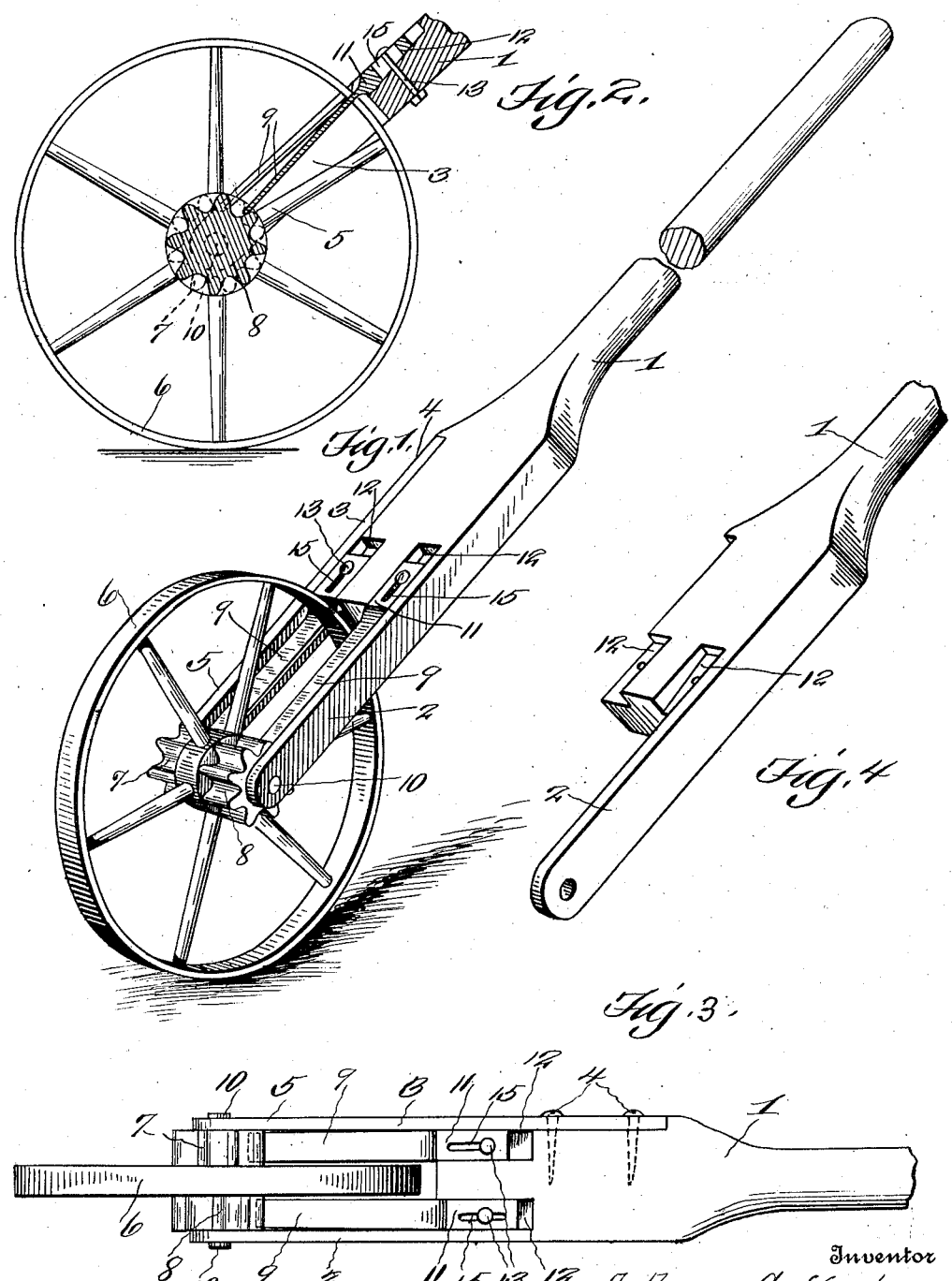

ANTHONY CAFFERTY, OF MAHANOY CITY, PENNSYLVANIA.

SOUNDING-WHEEL TOY.

1,103,030.                Specification of Letters Patent.    Patented July 14, 1914.

Application filed July 12, 1913. Serial No. 778,722.

*To all whom it may concern:*

Be it known that I, ANTHONY CAFFERTY, a citizen of the United States, residing at Mahanoy City, in the county of Schuylkill and State of Pennsylvania, have invented a new and useful Sounding-Wheel Toy; and I do hereby declare the following to be a full, clear, and exact description of the invention, such as will enable others skilled in the art to which it appertains to make and use the same.

This invention relates to a new and useful improved sounding wheel toy.

An object of the invention is to provide a toy of this nature for amusing children, and that can be placed upon the market at a comparatively small cost so as to bring it within the reach of the families of moderate means.

One of the features of the invention is the provision of a handle having a forked end, in the forks of which a wheel is journaled provided with a cog wheel on each side, the cog teeth of one wheel being in staggered relation with the cog wheel of the opposite wheel, so as to produce double sounds, by virtue of the paddles which engage the teeth.

The invention comprises further features and combination of parts, as hereinafter set forth, shown in the drawings and claimed.

In the drawings:—Figure 1 is a view in perspective of the improved sounding wheel toy constructed in accordance with the invention. Fig. 2 is a plan view. Fig. 3 is a sectional view on line 3—3 of Fig. 2. Fig. 4 is a detail view of the handle member.

Referring more particularly to the drawings, 1 designates a handle member recessed at one end as shown in Fig. 4 forming a single fork 2, while 3 denotes a plate secured to the handle at 4, constituting another fork 5. A wheel 6 which may be any suitable structure is provided having cog wheels 7 and 8, one upon each side. The teeth of the cog wheel 7 are arranged in staggered relation with the cog teeth of the cog 8, so as to produce double sounds, owing to the paddles 9 contacting with the teeth. Projecting from the cog wheels are pins 10, which are journaled in suitable bearings of the forks 2 and 5. The paddles or blades 9 are constructed with an enlargement 11, which are secured in recesses 12 by the bolts 13.

It will be seen that as the wheel 6 rolls upon the ground, pavement or other surface, the cog wheels are likewise rotated, and as rotated the paddles or blades flip from one tooth to another, thereby creating several sounds.

The enlargements 11 of the blades are provided with slots, through which the bolts 13 extend, these slots affording means for permitting the blades to be adjusted toward and from the cog wheels, so that one blade may create sounds less in volume than the sounds of the opposite blade and vice versa.

The invention having been set forth, what is claimed as new and useful is:—

1. In a sounding wheel toy, a handle member having a recess at one end upon one side and including a single fork on the opposite side of the same end, a plate secured in said recess constituting a second fork opposite the first fork, said handle member adjacent said forks having spaced recesses, a pair of blades having enlargements provided with slots arranged in said spaced recesses, a wheel located between the two blades and provided with oppositely arranged cog wheels, one upon each side adapted to be engaged by the blade to create sound as the cogs revolve with the wheel, pintles carried by the cog wheels mounted in bearings of the extremities of said fork, and means extending through the slots of the enlargement for adjustably securing said enlargements and blades in adjusted positions, in order that the sound of one blade or the other may be increased or decreased.

2. In a sounding wheel toy, a handle member having a recess at one end including an adjoining single fork, a plate secured to the handle member with a portion constituting a second fork opposite the first fork, said handle member adjacent said forks having spaced recesses, a pair of blades having enlargements secured in said spaced recesses, a wheel located between the two blades and provided with oppositely arranged cog wheels, one upon each side adapted to be engaged by the blades, the teeth of one cog wheel being arranged in staggered relations with the teeth of the opposite cog wheel so as to produce double sounds, and pintles carried by the cog wheels mounted in bearings of the extremities of said forks, and means whereby one or the other of said blades may be adjusted, in order to increase or decrease the sounds.

In testimony whereof I have signed my name to this specification in the presence of two subscribing witnesses.

ANTHONY CAFFERTY.

Witnesses:
ANDREW KOENIG,
PATRICK O'BRIEN.